Patented Dec. 22, 1931

1,838,078

UNITED STATES PATENT OFFICE

CAMILLE DREYFUS, OF NEW YORK, N. Y.

DERIVATIVE OF CELLULOSE COMPOSITION OF LOW INFLAMMABILITY

No Drawing.　　　Application filed July 18, 1929.　Serial No. 379,322.

This invention relates to the production of coating compositions, films or plastic compositions containing derivatives of cellulose and particularly organic derivatives of cellulose which have a low degree of inflammability imparted thereto by the addition of halogenated phenyl or other aromatic esters of low fatty acids.

An object of my invention is to provide compositions containing the derivatives of cellulose and particularly organic derivatives of cellulose such as cellulose acetate, which compositions have their inflammability greatly diminished by the addition thereto of halogen derivatives of phenyl or other aromatic esters of low fatty acids. Other objects of my invention will appear from the following detailed description.

I have found that if halogen derivatives of the phenyl or other aromatic esters of low fatty acids, such as of phenyl acetate, are added to compositions containing derivatives of cellulose and particularly organic derivatives of cellulose, the inflammability of the resultant product is reduced to a very great extent. While other halogen derivatives of the phenyl esters may be used, I prefer to employ bromine derivatives because they are more efficacious as fire retardants than the chlorine compounds and are considerably cheaper than the iodine compounds. One of the advantages of the use of these bromine derivatives is due to the fact that with relatively small quantities of these bromine compounds, a maximum high fire retardant effect is obtained.

In accordance with my invention a composition is made containing a suitable derivative of cellulose, a halogen derivative of a phenyl or other aromatic ester of a lower fatty acid and a suitable volatile solvent for the mixture. If desired, medium and/or high boiling solvents, plastifiers, pigments or other effect materials may be added to the composition to impart such properties as desired to the finished product, as is well understood in the liquid coating and plastic composition arts. The amount of a solvent used will vary with the purpose to which the composition is to be put. Thus if films are to be made, 300 to 600 parts of a volatile solvent such as acetone will be used to 100 parts of a cellulose derivative. If a lacquer is to be prepared, a larger quantity of the volatile solvent will be used; whereas if a plastic composition is to be made, the amount of volatile solvent will be considerably reduced, only such quantities being used as are necessary to form plastic compositions of the required plasticity to work them into desired shapes.

Of the derivatives of cellulose that may be used, inorganic esters such as cellulose nitrate, the organic esters of cellulose or the cellulose ethers may be cited. Examples of organic esters of cellulose are cellulose acetate, cellulose formate, cellulose propionate and cellulose butyrate and examples of cellulose ethers are ethyl cellulose, methyl cellulose and benzyl cellulose. Anyone or mixtures of two or more of these organic esters of cellulose may be used in the preparation of the composition. Because of its ease of manufacture and its many desirable properties, I prefer to employ cellulose acetate.

Any one of the well-known solvents for organic derivatives of cellulose may be employed, of which the following are examples: acetone, ethylene dichloride, ether, benzene, toluene, ethyl acetate, ethyl lactate, tetrachlorethane, etc., the choice of the solvent or solvent mixture depending on the solubility characteristics of the specific cellulose derivative employed.

When plastifiers are used, such materials as triacetin, mono methyl xylene sulfonamide, para-toluene sulphoanilide, diethyl phthalate, dibutyl phthalate or dibutyl tartrate, which are not of themselves fire retardants, may be employed. Moreover other plastifiers which have marked fire retardant properties such as triphenyl phosphate or tricresyl phosphate may be employed to impart plasticity and some degree of fire resistance to the finished article.

Since the proportions of ingredients to be used in making coating compositions, films or plastic compositions may be varied as is well understood in the art, specific proportions of these ingredients will not be given.

As stated before this invention relates to compositions containing a derivative of cellulose and halogen derivative of a phenyl ester or other aromatic ester of a lower fatty acid. While I prefer to employ the halogen derivatives of esters of phenol, the term "phenyl" as used in this specification and also in the claims includes not only esters formed by the esterification of phenol with acids, but also includes those esters which are formed by the esterification of cresols, xylenols, napthols or other homologues; that is, cresyl and xylenyl esters etc. While this invention includes the use of halogen derivatives of the phenyl esters of lower fatty acids broadly, such as of formic acid, acetic acid, propionic acid, etc., I prefer to employ the halogen derivatives of phenyl acetate. As stated above the chlorine or the iodine derivatives of these compounds may be used, but I prefer to use the bromine derivatives. The halogen may be a substitute for hydrogen in the nucleus or in the side chain or both of the cresyl or xylenyl radicals. Altogether I prefer to use tribrom phenyl acetate as the fire retardant, and this invention will be specifically described with respect to the use of this compound.

As to the relative proportions of the foregoing bromine derivatives of the phenyl esters of lower fatty acids that may be used in the preparation of the coating or plastic composition containing derivatives of cellulose, this will vary with the nature of the specific fire retardant used and the judgment of the operator. While it may be stated roughly that the proportion of fire retardant to be used will vary from 2 to 25% of the weight of the cellulose derivative employed, the exact amount to be used must be predetermined to suit the particular requirements, the fire retardant properties of the specific compounds used and the cost of the materials. By way of example, it is pointed out that where tribrom phenyl acetate is employed, I have found that from 2 to 5%, say 3%, of this material based on the weight of the cellulose acetate used, is sufficient to produce the required fire retardant properties in films formed from compositions containing them.

The tribrom phenyl acetate may be prepared in any suitable manner. Thus it may be prepared by the bromination of phenyl acetate, although I have found that for many purposes it is preferable to prepare the same by the acetylation of tribrom phenol with a mixture of acetic anhydride and acetic acid in the presence of a small amount of sulfuric acid as catalyst.

The use of tribrom phenyl acetate as a fire retardant in connection with cellulose acetate compositions presents many advantages. Unlike most bromine compounds used for this purpose, it is odorless, is neutral and does not develop acidity with age. Moreover films containing cellulose acetate and 3% by weight of tribrom phenyl acetate, when exposed to the ultraviolet light of a fadeometer, do not become discolored even after 100 hours' exposure, whereas films containing cellulose acetate and a like amount of tribrom phenol become markedly discolored when exposed in a fadeometer for the same length of time. This light-fastness is a very important property in connection with compositions containing derivatives of cellulose.

It is to be understood that the foregoing detailed description is given merely by way of illustration, and that many variations may be made therein without departing from the spirit of my invention.

Having described my invention, what I claim and desire to secure by Letters Patent is:

1. A composition of matter containing a derivative of cellulose and a halogen derivative of an aromatic ester of a lower fatty acid.

2. A composition of matter containing a derivative of cellulose and a halogen derivative of phenyl acetate.

3. A composition of matter containing a derivative of cellulose and a bromine derivative of an aromatic ester of a lower fatty acid.

4. A composition of matter containing a derivative of cellulose and a bromine derivative of a phenyl acetate.

5. A composition of matter containing a derivative of cellulose and a tribrom phenyl acetate.

6. A composition of matter containing an organic derivative of cellulose and a bromine derivative of an aromatic ester of a lower fatty acid.

7. A composition of matter containing cellulose acetate and a bromine derivative of an aromatic ester of a lower fatty acid.

8. A composition of matter containing cellulose acetate and a bromine derivative of phenyl acetate.

9. A composition of matter containing cellulose acetate and tribrom phenyl acetate.

10. A composition of matter containing a cellulose ether and a halogen derivative of an aromatic ester of a lower fatty acid.

11. A plastic composition containing an organic derivative of cellulose, a solvent and a bromine derivative of phenyl acetate.

12. A plastic composition containing an organic derivative of cellulose, a solvent and tribrom phenyl acetate.

13. A plastic composition containing cellulose acetate, a solvent and bromine derivative of phenyl acetate.

14. A plastic composition containing cellulose acetate, a solvent and tribrom phenyl acetate.

15. Articles made of the composition described in claim 1.

16. Articles made of the composition described in claim 6.

17. Articles made of the composition described in claim 14.

18. A composition of matter containing a cellulose ether and a bromine derivative of phenyl acetate.

19. A composition of matter containing a cellulose ether and tribrom phenyl acetate.

In testimony whereof, I have hereunto subscribed my name.

CAMILLE DREYFUS.